United States Patent [19]

Kamihama

[11] 4,275,930
[45] Jun. 30, 1981

[54] WHEEL COVER COMPRISING TWO OR MORE COVER PLATES EACH HAVING SPOKE-LIKE PORTIONS INSEPARABLE FROM OTHER PORTIONS

[75] Inventor: Kiyoshi Kamihama, Yokohama, Japan

[73] Assignees: Nissan Motor Company, Limited; Hashimoto Forming Kogyo Company Limited, both of Yokohama, Japan

[21] Appl. No.: 5,527

[22] Filed: Jan. 22, 1979

[30] Foreign Application Priority Data

Jan. 27, 1978 [JP] Japan .................................. 53/7399
Jan. 27, 1978 [JP] Japan ............................. 53/7868[U]

[51] Int. Cl.³ ............................................. B60B 7/04
[52] U.S. Cl. ................................ 301/37 SS; 301/37 R
[58] Field of Search ............... 301/37 R, 37 P, 37 SS, 301/37 T, 37 C, 37 CD, 37 TP, 37 PB; 29/159 A

[56] References Cited

U.S. PATENT DOCUMENTS

| 2,699,361 | 1/1955 | Jenkins, Jr. | 301/37 SS |
| 2,709,114 | 5/1955 | Plotkin | 301/37 SS |
| 2,725,258 | 11/1955 | Lyon | 301/37 SS |
| 3,145,059 | 8/1964 | Hemstreet | 301/37 SS |
| 3,999,268 | 12/1976 | Jacobs | 301/37 R X |
| 4,116,490 | 9/1978 | Huff et al. | 301/37 SS X |
| 4,171,149 | 10/1979 | Marks et al. | 301/37 R X |

FOREIGN PATENT DOCUMENTS

| 2402196 | 4/1975 | Fed. Rep. of Germany | 301/37 P |
| 2728122 | 1/1978 | Fed. Rep. of Germany | 301/37 R |

*Primary Examiner*—Charles A. Marmor
*Attorney, Agent, or Firm*—Schwartz, Jeffery, Schwaab, Mack, Blumenthal & Koch

[57] ABSTRACT

A wheel cover for road wheels of automobiles, made up of at least two generally circular cover members assembled and fixed together in a concentrically piled arrangement. Each of the cover members is a one-piece member which is made of a synthetic resin or a sheet metal and has a central portion, a generally annular peripheral portion and a multiplicity of elongate spoke-like portions each extending from the radially outer periphery of the central portion to the peripheral portion. Preferably the wheel cover includes an annular frame attached to its radially outside periphery and resilient retaining clips secured to the annular frame for ready and firm attachment of the wheel cover to a road wheel rim.

13 Claims, 9 Drawing Figures

— 4,275,930 —

WHEEL COVER COMPRISING TWO OR MORE COVER PLATES EACH HAVING SPOKE-LIKE PORTIONS INSEPARABLE FROM OTHER PORTIONS

BACKGROUND OF THE INVENTION

This invention relates to a wheel cover for disposition on the exposed side of a vehicle wheel rim, and more particularly to a wheel cover having spokes of ornamental effect.

Wheel covers for road wheels of automobiles are produced in a wide variety of designs to satisfy diversely discriminating tastes of the purchasers. Recently wheel covers having radially extending spokes formed of metal rods or wires have acquired firm-rooted and rather increasing popularity in many countries.

Although commercially valuable, this type of wheel covers are bothering the manufacturers with high costs of production. Usually the spokes, and in most cases other elements of a wheel cover, too, must be made of stainless steel which is a considerably costly material, and fitting of a multiplicity of spokes to circular or annular cover members requires much labor and is hard to automate. As an inconvenience to the users, conventional spoked wheel covers are heavier than the other types of wheel covers, and there is a possibility that spokes rattle and even separate from the wheel covers during running of the vehicle.

SUMMARY OF THE INVENTION

It is an object of the present invention to provide a spoked wheel cover for road wheels of automobiles, which wheel cover can be produced inexpensively without using metal rod or wire spokes but, nevertheless, presents an excellent ornamental appearance comparable to that of a popular wheel cover having metal spokes.

It is another object of the invention to provide a wheel cover which is, in addition to the above stated features, light in gross weight, satisfactorily high in physical strength and easy to attach firmly to a road wheel rim.

A wheel cover according to the invention comprises at least two generally circular cover members assembled together in a concentrically piled arrangement and fixed to each other. Each of the cover members is a one-piece member having a central portion, a generally annular peripheral portion and a multiplicity of elongate spoke-like portions each extending from the radially outer periphery of the central portion to the annular peripheral portion.

Preferably the cover members are made of a synthetic resin, but it is also possible to make either a portion or the whole of these cover members of a sheet metal.

The axially innermost one of the cover members may have a platy intermediate portion which intervenes between the central portion and the peripheral portion. In this case the spoke-like portions of this cover member take the form of elongate ribs formed on the front surface of the intermediate portion.

At least in the axially innermost one of the cover members, the peripheral portion may be shaped so as to allow the wheel cover to be secured to a rim of a road wheel by the insertion of resilient retaining means between the outside of the peripheral portion of the wheel cover and the road wheel rim. More preferably, the wheel cover may have an annular frame fixed to its radially outside periphery and a plurality of resilient retaining clips secured to the annular frame in a circumferentially spaced arrangement.

DESCRIPTION OF THE PREFERRED EMBODIMENTS

Figure 1:
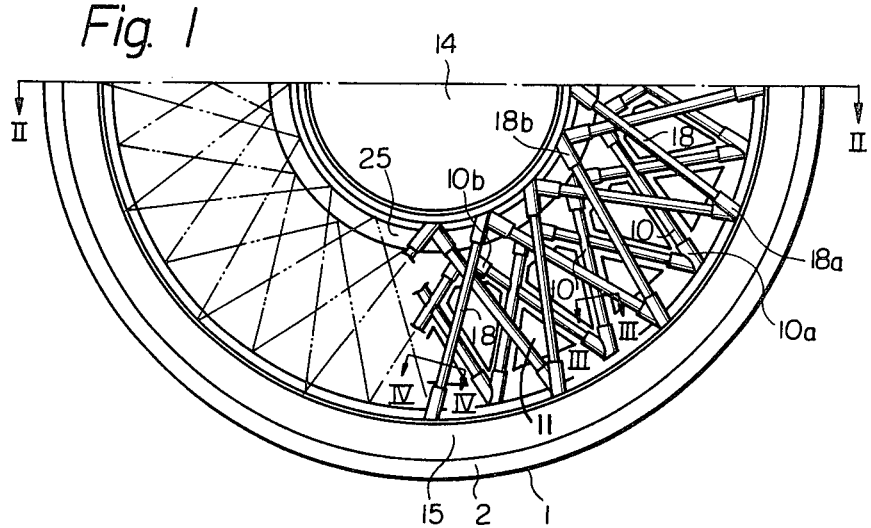
FIG. 1 is a partial front view of a wheel cover as an embodiment of the present invention.
Figure 2:
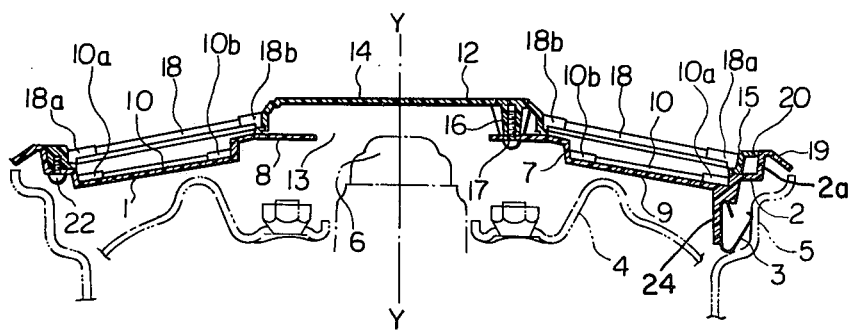
FIG. 2 is a sectional view taken along the line II—II of FIG. 1.

As a preferred embodiment of the invention, FIGS. 1 and 2 show a wheel cover assembly which is fundamentally made up of two cover members, namely, an inner cover member 1 and an outer or front cover member 12.

Figure 3:
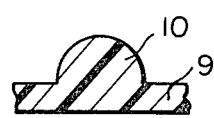
FIGS. 3 and 4 show spoke-like portions of the inner and outer cover members of the same wheel cover in sectional views taken along the lines III—III and IV—IV of FIG. 1, respectively.

The inner cover member 1 is a generally circular one-piece member having a hat-like or saucer-like shape, but it has a circular opening 13 in its central region. More particularly, this cover member 1 has a substantially flat, platy and annular portion 8 as its radially innermost portion, a radially outermost portion or brim portion 2, where the cover member 1 is shaped so as to be attachable to a rim 5 of a road wheel indicated by reference numeral 4, and a platy intermediate portion 9 in the form of a gently tapered cone frustum which intervenes between the inner and outer portions 8 and 2. A generally cylindrical wall 7 constitutes the boundary between the flat annular portion 8 and the tapered intermediate portion 9. The diameter of the circular opening is large enough to prevent collision of the annular portion 8 against a hub portion 6 of the wheel 4 upon attachment of the wheel cover to the wheel rim 5. On the front side, the intermediate portion 9 is formed with a multiplicity of elongate ribs 10 which extend from the generally cylindrical wall 7 to the brim portion 2 and each have a generally semicircular cross-sectional shape as shown in FIG. 3. In the embodiment shown in FIG. 1, these ribs 10 each extend obliquely (with respect to the diameters of the intermediate portion 9) such that every one of these ribs 10 intersects another one.

In ornamental effect, the elongate ribs 10 correspond to rod or wire spokes in conventional spoked wheel covers, but in the present invention these ribs 10 constitute part of the one-piece member 1, that is, the spoke-like ribs 10 are not different in material from the remaining part of this member and are inseparable from the inner, intermediate and outer portions 8, 9 and 2. The cover member 1 is preferably made of a synthetic resin relatively high in physical strength and produced by injection molding, but it is also possible to produce this cover member 1 by press-forming of a sheet metal, preferably a light metal such as aluminum or its alloy. In the case of making the cover member 1 of a synthetic resin, the product can be afforded with high resistances to mechanical shocks and heat by using, for example, polyphenylene oxide resin, acrylonitrile-butadiene-styrene resin, polypropylene resin or a glass fiber reinforced resin.

Preferably, a radially outer end portion 10a, optionally a radially inner end portion 10b, too, of each spoke-like rib 10 is made thicker (larger in cross-sectional dimensions) than the remaining portion with the objects of accentuating the resemblance between the ribs 10 and rod spokes supported by tubular sockets in conventional spoked wheel covers and also enhancing the compressional strenth of the ribbed intermediate portion 9 of the cover member 1. To give the cover member 1 the appearance of a wheel cover having real spokes, it is highly preferable that the surfaces of the ribs 10 are made to have a metallic and lustrous color by, for example, chromium plating while the remaining areas of the front side of the intermediate portion 9 are made to have an utterly different and darker color so that the ribs 10 may appear as if extending above and spaced from the front surface of the intermediate portion 9. As a preferred example, the front surface of the intermediate portion 9 is colored black except for the ribs 10, which are made to have a bright metallic or silvery color. The brim portion 2, too, is made to have a bright and metallic color.

In the embodiment of FIGS. 1 and 2, the brim portion 2 of the inner cover member 1 is bent frontwise so as to have a generally cylindrical wall 2a and, in the marginal region, further bent radially outwardly so as to give an annular flange 19. The outer diameter of the cover member 1 in the cylindrical wall portion 2a is close to the inner diameter of the wheel rim 5 in its front region utilized for attachment of a wheel cover.

The outer cover member 12, too, is a generally circular one-piece member including a central portion 14 in the form of a circular and shallow cup with its bottom wall as the frontmost part of this member 12, an annular peripheral portion 15 and a multiplicity of elongate spoke-like portions 18 (will be called spokes hereinafter) extending from a generally cylindrical wall or radially outer periphery of the cup-like central portion 14 to interconnect the central and peripheral portions 14 and 15. Similarly to the inner cover member 1, the outer cover member 12 including the spokes 18 is produced by injection molding of a synthetic resin or by press-forming of a light metal sheet.

The inner and outer cover members 1 and 12 are assembled in a concentrically piled arrangement as shown in FIG. 2 with the outer cover member 12 on the front side of the assembled wheel cover. The cup-shaped central portion 14 of the outer cover member 12 is larger in diameter than the central opening 13 of the inner cover member 1 such that, in the assembled state, the central portion 14 covers a radially inner region of the annular portion 8 of the inner cover member 1. On the back side, the central portion 14 of the outer cover member 12 is formed with cylindrical or tapered projections 16, at circumferential intervals, each of which is bored with a tap hole such that the inner cover member 1 can be fastened to the outer cover member 12 by fitting screws 17 into the tap holes in these projections 16. The brim portion 2 of the inner cover member 1 is secured to the peripheral portion 15 of the outer cover member 12 by means of screws 22 at circumferentially spaced several points. The peripheral portion 15 of the outer cover member 12 is bent frontwise and, in its marginal region, further bent radially outwardly so as to give an annular flange 20. The peripheral portion 15 is shaped and sized such that, in the assembled wheel cover, the annular flange 20 comes into abutment with the radially inside of the cylindrical wall 2a of the brim portion 2 of the inner cover member 1 and seems as if a radially innermost portion of the annular flange 19 of the inner cover member 1.

Figure 4:
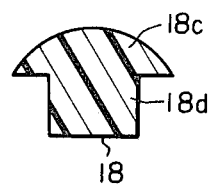

As can be seen in FIG. 2, the spokes 18 extend slantwise with respect to the central axis Y—Y of the wheel cover: the spokes 18 extend substantially in a conical plane nearly parallel to the gently tapered intermediate portion 9 of the inner cover member 1. Preferably the spokes 18 have a mushroom-like shape in cross section, as shown in FIG. 4, with the cap 18c of the mushroom on the front side of the cover member 12. In the embodiment of FIG. 1, the spokes 18 are arranged similarly to the spoke-like ribs 10 of the inner cover member 1, that is, the spokes 18 extend obliquely such that every one of these spokes 18 intersects another one. However, the spokes 18 are arranged such that, when the two members 1 and 12 are assembled into the wheel cover, every one of the spokes 18 does not completely overlap any of the spoke-like ribs 10 but intersects at least one of the spoke-like ribs 10 when viewed from the front side of the wheel cover.

Preferably, the spokes 18 are each made to have enlarged cross-sectional dimensions in their radially outer end portions 18a, optionally also in radially inner end portions 18b, with the objects as explained hereinbefore with respect to the end portions 10a and 10b of the spoke-like ribs 10. The spokes 18 are painted in the same color as the ribs 10, while the central portion 14 of the outer cover member 12 is painted in a different and relatively dark color.

As mentioned hereinbefore, the assemblage of the illustrated wheel cover is completed simply by fastening the inner cover member 1 to the outer cover member 12 with screws 17 and 22 after coloring of the individual cover members 1 and 12. As shown in FIG. 2, the assembled wheel cover can be secured to the wheel rim 5 by utilizing a plurality of retaining clips 3 each comprising a resilient detent. To utilize the clips 3, the inner cover member 1 is formed with a plurality of circumferentially spaced and backwardly projecting projections 24 on the back side of the intermediate portion 9. These projections 24 are formed in a radially outermost region of the intermediate portion 9 so as to project substantially parallel to the central axis Y—Y of the wheel cover (i.e. of the wheel hub 6) thereby to provide a radially inner support for each of the clips 3. In effects, these projections 24 afford an enhanced physical strength to the inner cover member 1 and make the clips 3 invisible. Accordingly the circumferentially spaced projections 24 may be replaced by a continuous and cylindrical projection. The wheel cover can be detached from the wheel rim 5 by prizing the wheel cover frontwise with a suitable tool such as a screwdriver.

As will be understood from the foregoing description and the illustration, the spoke-like ribs 10 on the inner cover member 1 in the wheel cover of FIGS. 1 and 2 are clearly visible from the front side of the wheel cover through the openings between the spokes 18 of the outer cover member 12. Due to the shape, arrangement and coloring of the ribs 10 and spokes 18, this wheel cover has a close resemblance in appearance to a conventional wheel cover having spokes of stainless steel rods and presents a very attractive appearance. The mushroom-shaped cross section of the spokes 18 affords a sufficiently high physical strength to the spokes 18, i.e. slender and elongate portions of the cover member 12. Besides, slenderness of each spoke 18 in an inner portion 18d (indicated in FIG. 4) beneath the cap portion 18c minimizes the hiding of the spoke-like ribs 10 by the spokes 18.

Aside from the resemblance to a wheel cover having rod or wire spokes, the above described wheel cover according to the invention is advantageous in the following points.

The cover members 1 and 12 can be produced each as a monoblock member by a process suitable to mass production such as injection molding of a synthetic resin without using costly stainless steel rods or wires, and the assemblage of the wheel cover can be easily achieved merely by fastening one cover member to the other, for example, with simple fastening means such as screws. Accordingly this wheel cover can be produced at remarkably reduced costs compared with conventional spoked wheel covers. This wheel cover is very light in gross weight because of the use of a relatively low density material such as a synthetic resin or a light metal and absence of considerably heavy metal rod or wire spokes. Since "spokes" in this wheel cover are integral with the remaining portions of each cover member, there is no possibility that the spokes rattle or separate from the wheel cover during running of the vehicle. The combination of the two cover members in a concentrically piled arrangement affords not only a gorgeous appearance but also a sufficient rigidity to the wheel cover.

Various modifications can be made to the wheel cover of FIGS. 1 and 2 as described hereinafter either separately or in various combinations.

A wheel cover according to the invention may be made up of three or more cover members each of which is a one-piece member of a synthetic resin or a light metal and includes spokes corresponding to the illustrated ones 18 or spoke-like ribs corresponding to the illustrated ones 10. In such cases, the innermost cover member alone is made to have a platy intermediate portion corresponding to the one 9 shown in FIG. 2.

The platy intermediate portion 9 of the inner cover member 1 may optionally have apertures or largely cut out areas 11 so as to leave only narrow bands along both sides of each spoke-like rib 10. Furthermore, the intermediate portion 9 may be replaced substantially entirely by a multiplicity of spokes corresponding to the spokes 18 of the outer cover member 12. It is also optional to make the platy intermediate portion 9 bulged and/or dented frontwise and/or backwardly either locally or entirely. The central portion 14 of the outer cover member 12, too, may be apertured or somewhat bulged and/or dented frontwise and/or backwardly. Of course these modifications should be made with due consideration of the physical strength of the resultant cover member and the wheel cover assembly.

The spokes 18 and the spoke-like ribs 10 may have cross-sectional shapes different from those shown in FIGS. 3 and 4, respectively. For example, they may be circular, rectangular or triangular in cross section.

Figure 6:
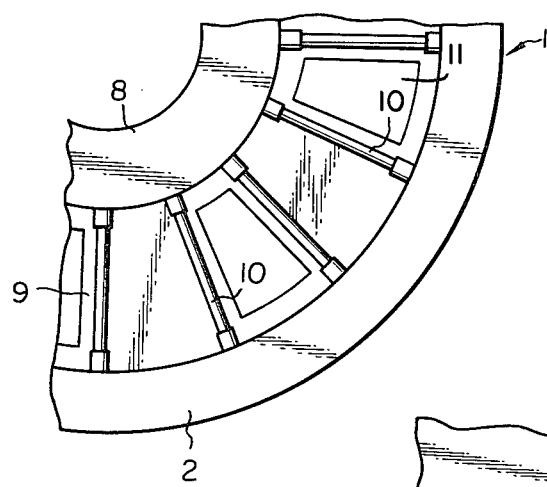
FIGS. 6 and 7 show two different examples of spoke arrangement in a wheel cover according to the invention.
Figure 7:
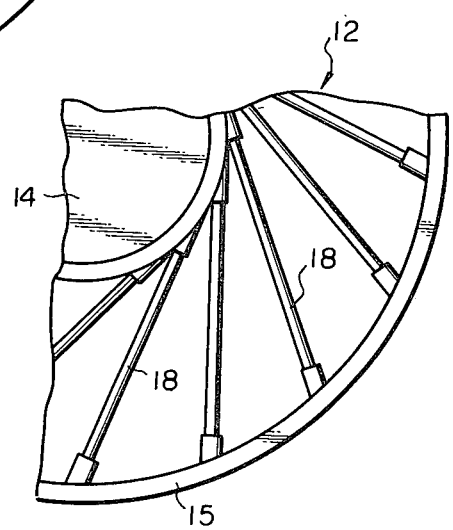

The spokes 18 and/or the spoke-like ribs 10 may be arranged in various patterns. It is not a requisite that each of the spokes 18 (or ribs 10) intersects another one of them. Either the spokes 18 or the ribs 10 may be arranged even exactly radially as shown in FIG. 6 or nearly tangentially of the circular central portion 14 (or 8) as shown in FIG. 7. Even in such a case, it is preferable that each of the spokes 18 intersects at least one of the ribs 10 when viewed from the front side of the assembled wheel cover. Furthermore, each of the spokes 18 and/or the ribs 10 may be curved.

Each of the spokes 18 may be formed with local projections which project from its back side so as to come into contact with either the front surface of the intermediate portion 9 or the ribs 10 of the inner cover member 1 thereby to augment the resistance of the spokes 18 to a bending force exerted thereon towards the inner cover member 1.

The coloring of the cover members 1 and 12 may be accomplished by paint coating by either spraying or brushing, or deposition of a metal by plating, vacuum evaporation or sputtering.

The inner cover member 1 may be fixed to the outer cover member 12 by using an adhesive, in place of, or in addition to, the screws 17 and 22. Spot welding (for metal cover members) or fusion bonding (for resin cover plates) is also of use.

Figure 5:
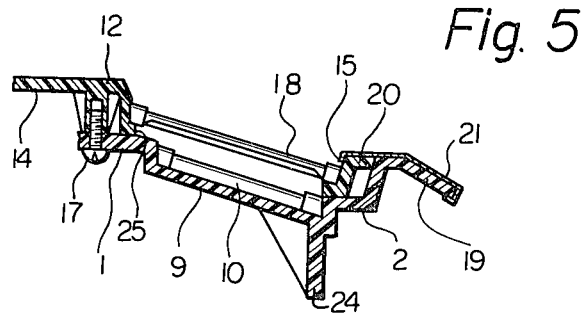
FIG. 5 is a fragmentary sectional view of a wheel cover, showing partial modifications of the wheel cover of FIGS. 1 and 2.

Referring to FIG. 5, it is preferable to attach annular cover 21 formed of a sheet metal to the radially marginal portion of the wheel cover of FIGS. 1 and 2 such that the circumferential edge and front surface of the flanged region 19 of the inner cover member 1 and the front surface of the flanged region 20 of the outer cover member 12 are overlaid with this cover 21 particularly when the cover members 1 and 12 are made of a synthetic resin. This metal cover 21 is quite effective for preventing damages such as cracking of the radially outer portions 2 and 15, particularly the former, of the wheel cover at the time of detaching the wheel cover from the wheel rim 5 by prizing the wheel cover with a tool such as a screwdriver or when the wheel cover is hit by a certain obstacle such as a stone during running of the vehicle.

To augment the strength of joints of the spokes 18 and the cup-shaped central portion 14 of the outer cover member 12, the radially outside of the cylindrical periphery of the central portion 14 may be stepped as clearly shown in FIG. 5 to give an annular shoulder 25 at such a location that the spokes 18 join the periphery of the central portion 14 on this shoulder 25. (As will be understood, such stepping of the central portion 14 is merely imaginary since the spokes 18 are molded, or press-formed, simultaneously and integrally with the central portion 14.)

It is not a requisite that the spokes 18 and or the spoke-like ribs 10 extend respectively in a conical plane or a slant plane as illustrated in FIGS. 2 and 5. If desired, the spokes 18 and/or the ribs 10 may be made to extend substantially in a plane normal to the central axis Y-Y of the wheel cover. However, slanting of the spokes 18 and/or the ribs 10 (i.e. intermediate portion 9), particularly the former, is preferable both for good appearance and for high strength.

It will be quite convenient to the users that a wheel cover according to the invention comprises a retaining means for firmly securing the wheel cover to a road wheel rim. In this regard, a preferred modification of the wheel cover of FIGS. 1 and 2 will be described hereinafter with reference to FIGS. 8 and 9.

Figure 8:
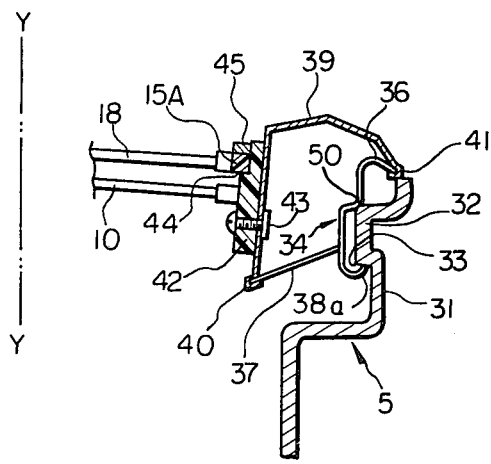
FIG. 8 is a fragmentary sectional view of another embodiment of the invention.

In FIG. 8, reference numeral 42 indicates a modified brim portion or radially outer peripheral portion of the inner cover member 1, and numeral 15A indicates a radially outer peripheral portion of the outer cover member 12. In this case the peripheral portion 42 of the inner cover member 1 has a cylindrical shape, formed with no flange, and the peripheral portion 15A of the outer cover member 12 takes the form of a simple ring. On the radially inside, the cylindrical portion 42 is stepped to give an annular shoulder 44 such that the peripheral portion 15A of the outer cover member 12 can be placed on this shoulder 44 and fixed to the peripheral portion 42 of the inner cover member 1. A ring 45 may be placed on the peripheral portion 15A of the outer cover member 12 and fixed to the radially inside of the cylindrical portion 42 of the inner cover member 1 thereby to reinforce the fixing of the outer cover member 12 to the inner cover member 1.

An annular and cross-sectionally C-shaped or inverted L-shaped frame 39 formed of a sheet metal is fixed to the radially outer cylindrical surface of the peripheral portion 42 of the inner cover member 1 by means of, for example, rivets 43. A circumferential edge portion 40 of this frame 39 is located backward of (axially inward of) the axially inner end of the cylindrical portion 42, and another circumferential edge portion 41 of the frame 39 is located radially outward of the cylindrical portion 42.

Figure 9:
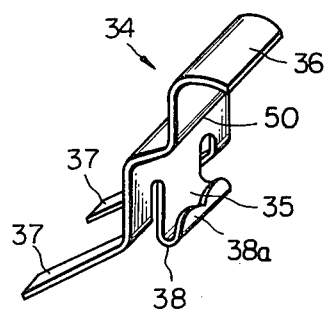
FIG. 9 is a perspective view of a resilient detent included in the wheel cover of FIG. 8.

A plurality of resilient clips 34 formed of a sheet metal are fixed to the annular frame 39 in a circumferentially spaced arrangement. These clips 34 are shaped so as to engage with a particularly shaped portion of the road wheel rim 5. In the case of FIG. 8, the road wheel rim 5 is formed with an annular shoulder 33 which constitutes the boundary between a cylindrical portion 32 close to the axially outer or front margin of the rim 5 and another cylindrical portion 31 axially inner from and slightly larger in diameter than the former cylindrical portion 32. Each of the clips 34 is approximately ϵ-shaped in cross section as shown in FIG. 9, and has a curled portion 38 which provides a claw 38a, a middle portion including an angled edge 50, a laterally (radially outwardly of the rim 5) extended end portion 36 and two arms 37 extending radially inwardly of the rim 5. At the extended end of the end portion 36, each clip 34 is fixed to the edge portion 41 of the annular frame 39 by crimping, and at the extended end of the arms 37 to the edge portion 40 also by crimping. The clips 34 are shaped and sized such that, when the wheel cover is inserted into the wheel rim 5, the claw 38a of each clip 34 abuts on the shoulder 33 of the wheel rim 5 while the angled edge 50 of each clip 34 abuts on the axially front end of the cylindrical portion 32 of the rim 5. The frame 39 is designed such that, in this state, the crimped edge 41 is located close to the axially front margin of the wheel rim 5. Preferably a rounded notch 35 is made into the claw 38a so that the claw 38a may have two almost pointed edges on both sides of this notch 35. This is effective for further ensuring that the claw 38a remains forcibly pushed against the shoulder 33 of the rim 5 once the wheel cover provided with the frame 39 and the clips 34 is inserted into the wheel rim 5 from the axially front side thereof.

At assemblage of the wheel cover of FIG. 8, the annular frame 39 is attached to the cylindrical portion 42 of the inner cover member 1 after fixing of the outer cover member 12 to the inner cover member 1, and thereafter the clips 34 are fixed to the frame 39 with the rivets 43 or alternatively with suitable screws or by staking.

The wheel cover of FIG. 8 can be attached to the wheel rim 5 quite easily and, nevertheless, very firmly. The attached wheel cover scarcely rattles during running of the car, and there is no possibility that the wheel cover separates from the wheel rim 5 during running of the car. This is an important advantage since a wheel cover separated from a car running on the road offers a significant danger to other vehicles and pedestrians. Besides, the combination of the frame 39 and the clips 34 can be produced and attached to the assembly of the cover members 1 and 12 at low material and labor costs. Furthermore, when attached to the wheel rim 5 this wheel cover presents an elegant appearance because the frame 39 keeps the clips 34 from sight.

What is claimed is:

1. A wheel cover for a road wheel of a vehicle, comprising an assembly of at least two generally circular cover members assembled together in a concentrically piled arrangement and fixed to each other, each of said cover members being a one-piece member having a central portion, a generally annular peripheral portion and a multiplicity of elongate spoke-like portions each extending from the radially outer periphery of said central portion to said peripheral portion, said peripheral portion of one of said at least two cover members having a cylindrically shaped radially outer surface which provides a radially outermost peripheral surface of said assembly, said peripheral portion of the adjacent, remaining cover member being fixed to the radially inside of said peripheral portion of said one cover member, a retainer ring placed on an axially outer side of said peripheral portion of said remaining cover member and fixed to the radially inside of said peripheral portion of said one cover member, a generally annular frame formed of sheet metal and fixed closely to said radially outermost peripheral surface of said assembly and a plurality of resilient retaining means for securing the wheel cover to the rim of the road wheel fixed to the radially outside of said frame in a circumferentially spaced arrangement.

2. A wheel cover according to claim 1, wherein only the axially innermost one of said at least two cover members has a platy intermediate portion intervening between said central portion and said peripheral portion, said spoke-like portions of said one of said cover members taking the form of elongate ribs formed on the front side of said intermediate portion.

3. A wheel cover according to claim 2, wherein the surfaces of said elongate ribs have a first color, the front surface of said intermediate portion having a second color different from and darker than said first color.

4. A wheel cover according to claim 2, wherein said intermediate portion is formed with apertures in areas divided by said elongate ribs.

5. A wheel cover according to claim 1, wherein at least one of said cover members is made of a synthetic resin.

6. A wheel cover according to claim 5, wherein said at least one of said cover members is a member produced by injection molding of said synthetic resin.

7. A wheel cover according to claims 1, 2 or 5, wherein each of said spoke-like portions in at least one of said at least two cover members intersects at least one of the other spoke-like portions of the same cover member in a region radially outward of said radially outer periphery of said central portion and radially inward of said peripheral portion.

8. A wheel cover according to claims 1, 2 or 5, wherein said spoke-like portions of said at least two cover members are arranged such that said spoke-like portions in one of said cover members intersect said spoke-like portions of at least one of the remaining cover members when the wheel cover is viewed generally axially from the front side thereof.

9. A wheel cover according to claim 1, wherein a radially outer end portion of each of said spoke-like portions is larger in cross-sectional area than a middle portion of the same spoke-like portion.

10. A wheel cover according to claim 1, wherein said frame has two axially distant and generally radially outwardly projecting portions each to give a circumferential edge, each of said resilient retaining means being formed of a resilient sheet metal and having two arm portions respectively fixed to said two projecting portions of said frame at the circumferential edges thereof.

11. A wheel cover according to claim 10, wherein each of said resilient retaining means has an angled edge between said two arm portions and a curled portion which provides a claw distant from said angled edge in the direction axially inwardly of the wheel cover.

12. A wheel cover according to claim 1, wherein the number of said at least two cover members is two, one of which is disposed axially inwardly of the other with respect to the vehicle road wheel, said peripheral portion of the axially inner one of said cover members having said cylindrically shaped radially outer surface.

13. A wheel cover according to claim 12, wherein the radially inside of said peripheral portion of the axially inner one of said cover members is formed with an annular shoulder in an axially outer region thereof, said peripheral portion of the axially outer one of said cover members being placed on and fixed to said annular shoulder.

* * * * *